May 4, 1948.  H. F. PITCAIRN  2,440,758

TAKE-OFF SYSTEM FOR ROTATIVE WINGED AIRCRAFT

Filed March 9, 1945     3 Sheets-Sheet 1

INVENTOR.
Harold F. Pitcairn
BY
ATTORNEYS

May 4, 1948. H. F. PITCAIRN 2,440,758
TAKE-OFF SYSTEM FOR ROTATIVE WINGED AIRCRAFT
Filed March 9, 1945 3 Sheets-Sheet 2

INVENTOR.
Harold F. Pitcairn
BY
ATTORNEYS

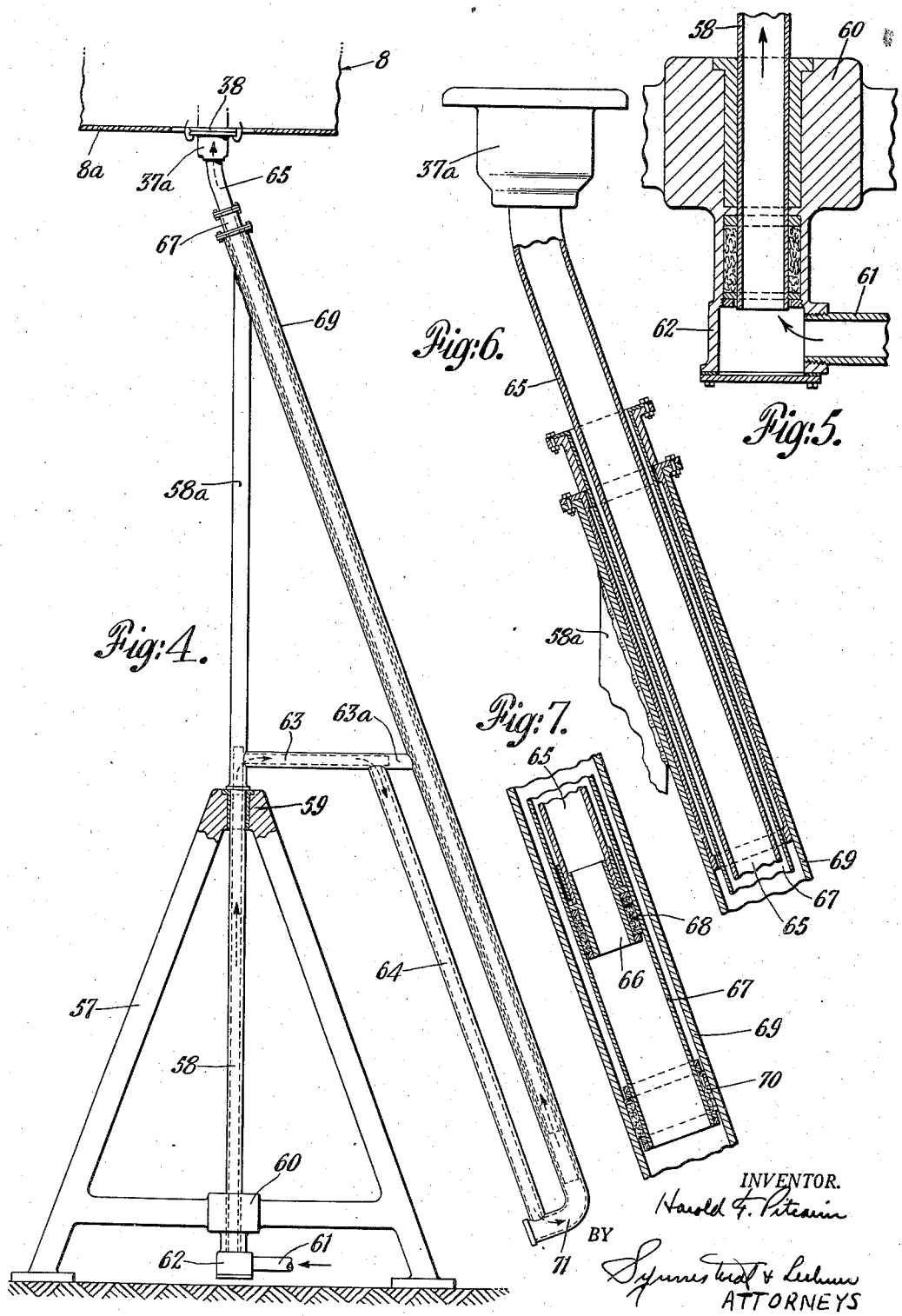

Patented May 4, 1948

2,440,758

UNITED STATES PATENT OFFICE 2,440,758

TAKE-OFF SYSTEM FOR ROTATIVE WINGED AIRCRAFT

Harold F. Pitcairn, Bryn Athyn, Pa., assignor to Autogiro Company of America, Philadelphia, Pa., a corporation of Delaware Application March 9, 1945, Serial No. 581,789

13 Claims. (Cl. 244—17)

This invention relates to rotative winged aircraft and is particularly concerned with a system for effecting take-off of such aircraft.

Although various features of the invention are adapted to use in association with any rotor equipped aircraft, whether or not the rotor is power driven in normal flight, the invention is of particular applicability to that type of aircraft incorporating a sustaining rotor capable of aerodynamic or autorotational actuation during at least some phases of normal flight operation. In a typical aircraft incorporating an autorotatable sustaining rotor, a single multi-bladed rotor is mounted in a position generally centralized over the center of gravity of the aircraft, the aircraft further being provided with one or more propulsive airscrews adapted to effect translational flight, the airscrews being driven by one or more engines mounted on the aircraft. The sustaining rotor in such aircraft is kept in motion by virtue of the airflow across the blades of the rotor, as set up either by translational flight, or in gliding or vertical descent without power.

Several methods for effecting take-off of this type of aircraft are already known, including preliminarily driving the rotor from an engine thereon while the aircraft is on the ground and then disconnecting the power drive and effecting take-off following a take-off run. In accordance with another known system, the rotor blade pitch angle is reduced to a non-lifting value and the rotor is power driven from an engine on the aircraft while the machine is on the ground, the R. P. M. initially imparted being higher than the normal flight R. P. M., so as to store excess kinetic energy in the rotor. When take-off is desired the power drive is disconnected from the rotor and the pitch angle of the rapidly rotating rotor blades is increased and the excess kinetic energy stored in the rotor is converted to lift, thereby causing the aircraft to rise vertically or substantially vertically from the ground, following which (or during which) the propulsive airscrew or airscrews establish translational flight.

Both of the take-off systems just described require that relatively heavy and complicated power transmission mechanism be built into the machine.

On the other hand the present invention contemplates employment of a take-off system which utilizes a power source external to the aircraft and not carried thereby, the system of the present invention being capable of effecting substantially vertical take-off. In this way the advantages of substantially vertical take-off are achieved while avoiding some of the disadvantages of prior practice, including the necessity for carrying power transmission mechanism between an engine on the aircraft and the rotor hub.

More specifically, the invention contemplates temporary coupling of a power source on the ground with the aircraft, as by means of a flexible power transmission arranged to accelerate the rotor up to a suitable take-off speed and preferably to continue driving the rotor during the course of the take-off, for which purpose the flexible power transmission is extensible. When the desired elevation from the ground has been attained, the power transmission is disconnected, and translational flight established by the propulsive airscrew or airscrews.

Another object of the invention is the employment of a rotor drive system which is "non-reactive," i. e., a system for driving the rotor which does not tend to cause the body of the aircraft to rotate in the opposite direction, as is the case with mechanical drive systems interconnecting the rotor hub and an engine mounted on the aircraft. In this way the employment of special means for counteracting rotor driving torque (such as the helicopter type of anti-torque rotor at the tail of the machine rotating about a horizontal axis), is obviated.

For the above purpose the invention contemplates equipping the rotor blades with jet reaction devices and, as a source of power on the ground, utilizing an appropriate fluid pressure power source, in which case the power transmission which is adapted to be temporarily coupled with the aircraft for take-off takes the form of a flexible fluid pressure connection.

As an additional object, the invention provides, in a system of the type above mentioned, pilot operable control means on the aircraft for disconnecting the power transmission when the take-off has been completed; also automatic mechanism for paying-out the flexible power transmission during the course of the take-off; automatic mechanism for reeling-in the flexible power transmission after the same has been disconnected from the aircraft; and means providing automatically for shut-off of power through the flexible transmission, when the transmission has been disconnected from the aircraft following a take-off.

The foregoing and other objects and advantages of the invention will appear more fully following a description of the accompanying drawings in which—

Figure 4 is an elevational view of a modified form of power transmission in which fluid pressure connections are employed in a telescopic arrangement;

Figure 5 is an enlarged vertical sectional view through a portion of the mechanism of Figure 4; and Figures 6 and 7 are vertical sectional views of upper and lower end portions of the telescopic fluid pressure connections of Figure 4.

Figure 1:
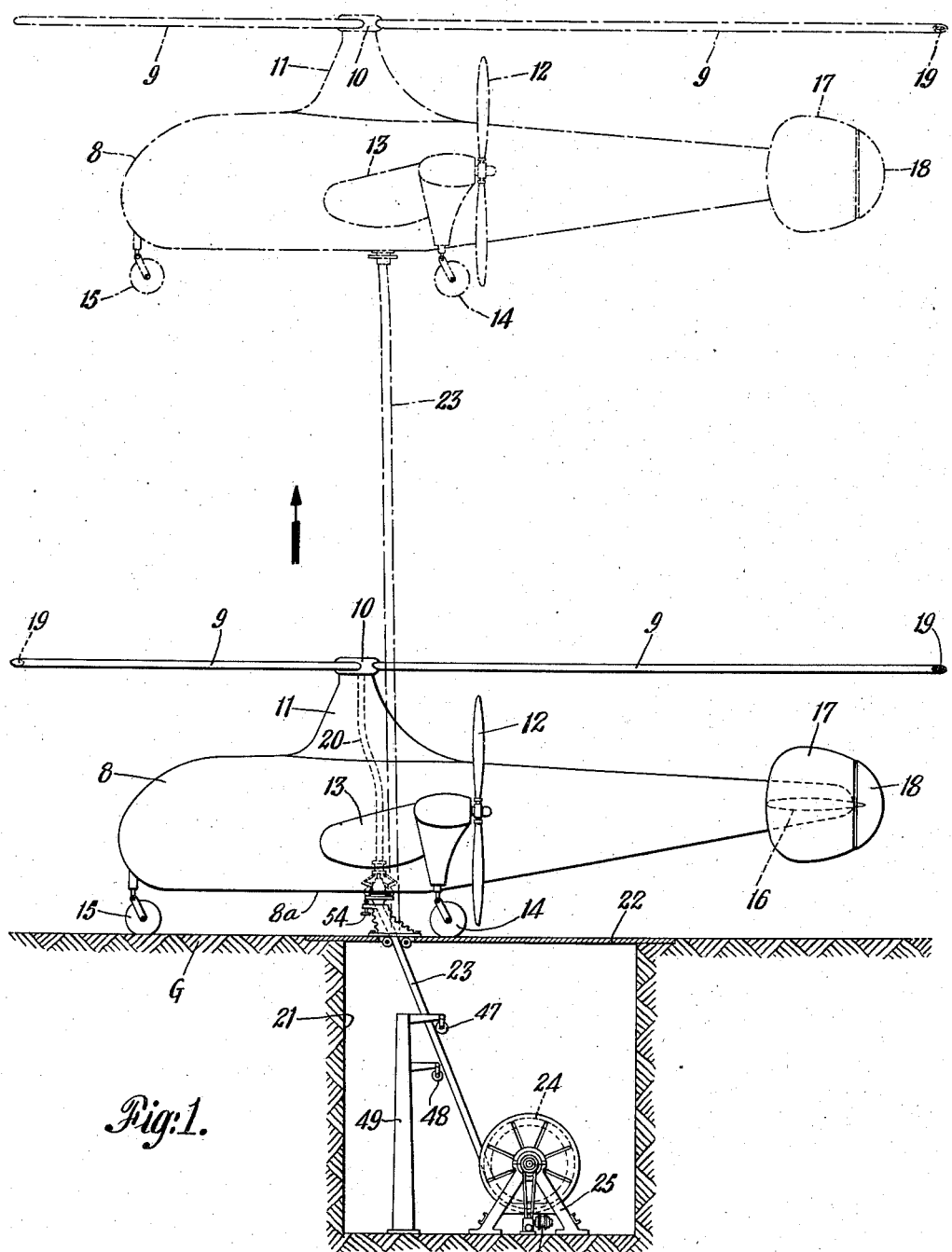
Figure 1 is a somewhat schematic view illustrating an aircraft of the type above mentioned standing on the ground above a chamber in which various parts of the power transmission and control mechanism for the take-off are arranged, this view also showing in chain dotted lines a second position of the aircraft during the course of a take-off.

In Figure 1 the aircraft comprises a body 8, over which a sustaining rotor is mounted incorporating blades 9 connected with a hub 10 which latter is mounted by means of a pylon structure 11. In the machine illustrated pusher-type propulsive airscrews 12 are employed, one being mounted toward each side of the body, as by an outrigger 13 which also serves to carry one of the main landing wheels 14. The airscrews 12 may be driven from a power plant (not shown) within the body, as by means of power drive shafts extended through the outriggers 13. A nose landing wheel 15 is also indicated in Figure 1. Toward the rear end of the body 8 an empennage is provided including horizontal stabilizer surfacing 16, vertical fins 17 and rudders 18 trailing the vertical fins 17.

As shown in Figure 1, the aircraft is illustrated substantially in outline, since the general structure of the aircraft itself forms no part of the present invention per se. Several factors of importance should, however, be noted, including the following:

It is contemplated that each rotor blade 9 be connected with the rotative hub by pivotal mountings providing at least some freedom for blade swinging movement in directions transverse the mean rotative path of travel so as to accommodate differential flight forces during translational flight. In addition, it is contemplated that the rotor blades be mounted on the hub with freedom for pitch change movement and that a control means be provided for simultaneously raising and lowering the pitch of all of the blades, whereby to vary the thrust of the rotor and provide for increasing the thrust when it is desired to take-off from the ground. Some known form of rotor control is also contemplated, such for example as control by tilting the rotor hub, as disclosed, for instance in copending application of Juan de la Cierva, Serial No. 645,985, filed December 6, 1932 (issued as Patent 2,380,580), or control by cyclically varying the rotor blade pitch angles as disclosed, for instance, in copending application of Juan de la Cierva, Serial No. 698,372, filed November 16, 1933 (issued as Patent 2,380,582). Since rotor blade mountings providing the functions referred to above are known in the art (for example in said Patent 2,380,582 and corresponding British Patent 410,532), no specific disclosure thereof is given herein.

As above mentioned, the rotor blades are preferably equipped with jet reaction nozzles 19 to which jet reaction fluid, such as compressed air, steam or the like is supplied through the blades themselves, and through the hub, from a fluid pressure connection 20 which extends downwardly through the pylon to a point adjacent the bottom or floor 8a of the body 8. The arrangement of hub and blade mounting parts providing for transmission of fluid therethrough forms no part of the present invention per se, but it is noted that suitable mechanism of this type is disclosed in copending application of C. G. Pullin, Serial No. 484,064, filed April 22, 1943 (and in corresponding British Patent 557,011). As is brought out below, the fluid pressure connection 20 is adapted to be coupled with the flexible power transmission for receiving the jet operating fluid therefrom.

As shown in Figure 1, the aircraft is at rest on the ground G, a chamber 21 being provided below the surface and closed by a cover plate 22. In connection with this showing it will be understood that the equipment and system of the present invention are applicable to other situations, for instance to landing and take-off platforms on ships, on the roofs of buildings, or the like, and the word "ground" in the claims is thus to be broadly understood.

Figure 2:
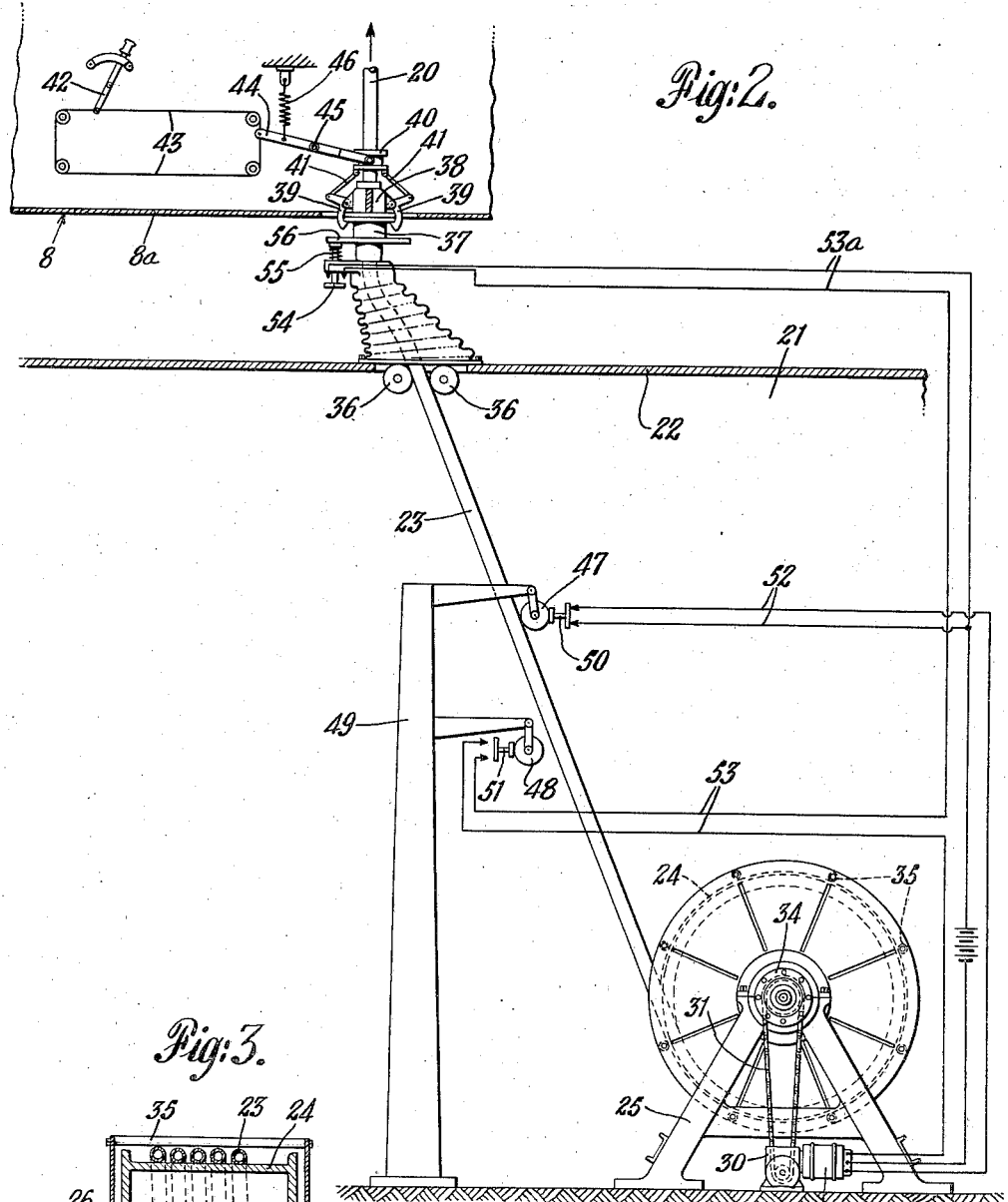
Figure 2 is an enlarged view partly in vertical section and partly in elevation illustrating various features of the take-off system of the present invention.
Figure 3:
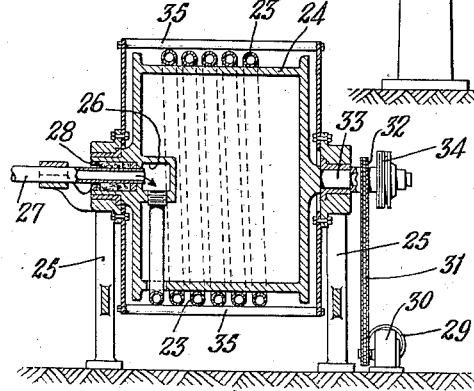
Figure 3 is an axial vertical sectional view through a suitable reel and a fluid pressure type power transmission, as employed in the arrangement of Figures 1 and 2.

In the embodiment of Figures 1 to 3, the power transmission which is extensible and retractable takes the form of a flexible hose 23 associated with a drum type reel 24 (see Figure 3) rotatively mounted by standards 25—25. One end of the hose 23 is extended inwardly through an aperture in the drum wall of the reel for connection with a chamber 26, with which chamber the fluid pressure supply line 27 also communicates, this supply line being arranged coaxially with the axis of the reel and being extended through one of the mounting bearings therefor. Pressure leakage is avoided by employment of a stuffing box 28 of known type.

The reel 24 is adapted to be driven from the electric motor 29 through reduction gearing 30 and a belt or chain drive 31, which latter cooperates with a pulley or sprocket 32 mounted on the reel shaft 33 and adapted to be drivingly connected with said shaft 33 through a torque limiting clutch 34. The torque limiting clutch preferably is constructed to operate in either direction, as by employing spring pressed friction plates. The motor 29 is of the type capable of operation in either direction, so as to effect rotation of the reel either to pay-out or reel-in the hose 23.

A series of guide rollers 35 is arranged about the circumference of the reel, each roller being rotative about its own axis but the series being fixed as against rotation about the axis of the reel. These rollers serve to keep the hose in proper position on the reel.

The hose 23 is extended upwardly from the reel to pass between a pair of guide rollers 36 and through an aperture in the cover plate 22 forming the roof of the chamber 21. At its free end the hose 23 is provided with a fitting 37 adapted to be coupled with a complementary fitting 38 which latter is connected with the pressure connection 20 in the body of the aircraft. Connection 37 is provided with a flange adapted to be engaged by a pair of pivoted hook members 39 which are actuable by a vertically slidable collar 40 through intermediate connecting links 41. As will readily be seen from inspection of Figure 2, when the collar 40 is drawn upwardly the hook members 39 are released, thereby permitting disconnection of the coupling members 37 and 38.

Vertical movement of collar 40 is under the control of a hand lever 42 preferably positioned in the aircraft for convenient access by the pilot. The lever 42 is connected with a cable 43 which in turn is coupled with lever 44, pivoted as at 45, and having a forked end with pins engaging the collar 40. A spring 46 normally urges the collar 40 downwardly, thereby tending to maintain interengagement of the coupling members 37 and 38. The arrangement of the parts just described is preferably such that the coupling member 37 may automatically be disengaged from the coupling member 38 upon a substantial or excessive pull, as might occur toward the end of a take-off, the hook members 39 being forced outwardly against the force applied by spring 46.

The coupling member 37 is desirably of that known type which automatically closes upon disconnection from the cooperating coupling member 38. In this way loss of pressure fluid is avoided after the flexible transmission has been disconnected following a take-off.

Certain automatic controls for the operation of the reel 24 are provided, for which purpose two swingingly mounted rollers 47 and 48 are positioned adjacent the hose 23 within the chamber 21. These rollers may appropriately be mounted on a standard 49. Roller 47 is so located as to be displaced toward the right (when viewed as in Figure 2) when the hose 23 is under tension, as, for instance, when the aircraft is taking-off and the hose is being extended. On the other hand, roller 48 is positioned to be engaged by the hose 23 when the latter is slackened, for instance, when the hose has been disconnected from the aircraft.

The rollers 47 and 48 are associated with contact or switch members 50 and 51 respectively, each of which upon being displaced is adapted to complete an electric circuit associated with the motor 29 for driving the reel. The circuit 52 which is associated with the switch 50 is adapted to complete the circuit in the motor windings in a manner providing for that direction of rotation which effects paying-out of the hose 23. On the other hand, the circuit 53 associated with switch 51 provides for rotation of the motor 29 in that direction effecting reeling-in of the hose 23.

From the above it will be seen that when the hose is under tension, the reel is rotated in a direction to pay-out the hose; and when the hose is slackened, the reel is rotated in that direction providing for reeling-in of the hose.

Circuit 53 is also associated with a circuit 53a with which switch or contact member 54 cooperates, this switch being normally urged towards its position in which the circuit 53a is completed by means of a spring 55. Switch 54 is adapted to be actuated by a flange 56 projecting from the coupling member 37. In this way whenever the hose is retracted or reeled-in, when the flange 56 of the coupling 37 abuts the switch member 54 the circuit 53a is broken thereby preventing further reeling-in of the hose, even if the switch 51 is in position to complete circuit 53.

In effecting a typical take-off with the system above described, the aircraft is brought into position, such as shown in Figure 1, in which the couplings 37 and 38 may be interconnected. This interconnection automatically provides for opening of the fluid passage in coupling 37, so that fluid under pressure is delivered through the pipe 20 and through the rotor blades to the jet reaction nozzles 19. At this time the pitch control for the rotor blades is desirably adjusted so that the mean pitch angle is at a low value, and the rotor accelerates. When an appropriate take-off R. P. M. has been attained the rotor blade pitch angle is increased and the machine rises from the ground substantially vertically as is indicated in chain dotted lines at the top of Figure 1. After an appropriate elevation has been attained, the pilot actuates lever 42 to disconnect the coupling members 37—38, and the propulsive airscrews 12 are then employed to effect translational flight, rotation of the rotor being continued by the action known in this art as autorotation.

Upon disconnection of the coupling member 37 from the aircraft, the hose 23 is slackened, thus becoming disengaged from roller 47 and engaging roller 48 as a result of which switch 51 is actuated to complete the circuit through the windings in motor 29, in a sense providing for driving the reel in a direction to effect reeling-in of the hose 23. This reeling-in continues until the flange 56 of the coupling member 37 engages the switch 54 to break the motor circuit, thus terminating the reeling-in of the hose.

Another form of extensible and retractable fluid pressure transmission is illustrated in Figures 4 to 7 inclusive. In this form it is contemplated that a standard 57 be mounted in the chamber below the landing surface, the standard serving to rotatively support an upright tubular member 58, as by bearings 59 and 60. A fluid pressure supply line 61 is coupled with the lower end of the upright tube 58, as by means of a junction box 62 (see Figure 5) which desirably is arranged to remain stationary but to permit flow of pressure fluid from the supply line 61 to the pipe 58 even during rotation of the latter.

At a point above the bearing 59 a transversely extending connection 63 is arranged, which is adapted to receive fluid from pipe 58 and deliver the same to the downwardly inclined pipe 64, the latter delivering the pressure fluid to the lower end of the telescopic assembly described just below.

A telescopic assembly preferably includes an internal flexible hose connection 65 with the upper end of which a coupling 37a is associated, this coupling desirably being of the type described above in connection with the first form, and being adapted for cooperation with coupling 38 mounted on the aircraft adjacent the bottom wall 8a thereof. The lower end of the hose connection 65 is attached to a cylindrical member 66 adapted to slide in the surrounding tube 67, suitable packing 68 being interposed to prevent fluid leakage. Tube 67 is arranged to telescope within another tube 69, appropriate packing 70 again being interposed to avoid fluid leakage.

As will be seen from Figure 4, fluid is delivered from the connection 64 through an elbow 71 into the lower end of the external telescoping member 69 and from there into the inner telescoping tube 67 and ultimately to the innermost member 65.

The telescoping assembly is supported not only at its lower end (by means of elbow 71) but also adjacent its upper end by an extension 58a of the upright rotatively mounted pipe 58. Still further, if desired, the telescoping assembly may be supported intermediate the upper and lower ends as by an extension 63a of the transverse pipe 63.

The mounting of the telescoping assembly, as above described, provides for free rotation thereof about an upright axis, and with the telescoped members inclined from the vertical, as shown in Figure 4, the unit will automatically adjust itself about an upright axis to accommodate variations in the flight path followed by the aircraft in taking-off. Making the final pressure connection 65 flexible also aids in accommodating variations in flight path during take-off.

In the system of Figure 4 it is contemplated that the fluid transmission will automatically be extended by being lifted with the aircraft and that, at least in large part, gravity will serve to retelescope the parts after the coupling member 37a has been disconnected from the aircraft. It will be understood that a pilot operable control means, such as the lever 42 will also be employed in the system of Figures 4 to 7, so that the pilot may effect disconnection of the power transmission when the desired altitude has been attained.

I claim:

1. A take-off system for an aircraft having a sustaining rotor, comprising driving means associated with the rotor for driving the rotor for take-off, an energy supply source on the ground, flexible transmission means for interconnecting said source and said aircraft and powering said driving means, the said transmission means being disconnectible from the aircraft, and mechanism automatically operative on tensioning of the transmission means to effect paying out of the transmission means.

2. A take-off system for an aircraft having a sustaining rotor, comprising driving means associated with the rotor for driving the rotor for take-off, an energy supply source on the ground, flexible transmission means for interconnecting said source and said aircraft and powering said driving means, the said transmission means being disconnectible from the aircraft, and mechanism automatically operative on slackening of the transmission means to effect retraction of the transmission means.

3. A take-off system according to claim 1 wherein said paying out mechanism comprises a reel located on the ground, on which reel said transmission means is wound.

4. A take-off system according to claim 1 wherein there are means on the aircraft operative to control said transmission means.

5. A take-off system according to claim 1 wherein said driving means comprise expansible-gas jet-reaction equipment associated with the rotor, and wherein said transmission means comprises a fluid conveying tube and mechanism is provided for shutting off the fluid flow when the transmission means is disconnected from the aircraft.

6. A take-off system according to claim 5 wherein the transmission means is quickly disconnectible while the aircraft is air-borne, and the shut-off mechanism is constructed to be automatically operative upon such disconnection.

7. For an aircraft having a sustaining rotor and jet reaction means associated with the rotor for driving the rotor during take-off, the combination of a power source on the ground, flexible power transmission means for interconnecting the power source and said reaction means, the power transmission means being disconnectable from the aircraft, and means operative under the influence of tensioning and slackening of the power transmission means for extending and retracting the power transmission means.

8. A construction according to claim 7 in which the power mechanism comprises flexible fluid pressure power transmission means.

9. A construction in accordance with claim 7 in which the power transmission means comprises a disconnectable fluid pressure connection automatically operative to effect shut-off thereof upon being disconnected.

10. A construction in accordance with claim 7 and further including control means on the aircraft for disconnecting the power transmission means, and in which said power transmission means includes a disconnectable fluid pressure connection automatically operative to effect shut-off thereof upon being disconnected.

11. For an aircraft having a sustaining rotor and driving means associated with the rotor for driving the rotor during take-off, the combination of a power source on the ground, flexible power transmission means for interconnecting the power source and the said driving means, the power transmission means being disconnectable from the aircraft, and mechanism automatically operative upon disconnection of the power transmission means for reeling in the power transmission means.

12. For an aircraft having a sustaining rotor and driving means associated with the rotor for driving the rotor during take-off, the combination of a power source on the ground, flexible transmission means for interconnecting the power source and the said driving means, the power transmission means being disconnectable from the aircraft, reversible power reel means associated with the power transmission means, the reel means having control means operative under the influence of slackening of the transmission means to effect reeling in of the transmission means, and under tensioning of the transmission means to effect paying out of the transmission means.

13. A construction in accordance with claim 12 in which the reel means is electrically powered and the control means comprises electrical switch means operative under the influence of slackening of the transmission means to energize the reel power means in one direction of rotation and operative under the influence of tensioning of the power transmission means to energize the reel power means in the opposite direction of rotation.

HAROLD F. PITCAIRN.

REFERENCES CITED

The following references are of record in the file of this patent:

UNITED STATES PATENTS

| Number | Name | Date |
|---|---|---|
| 1,523,926 | Ypma | Jan. 20, 1925 |
| 1,806,833 | Ullendorf | May 26, 1931 |
| 1,806,834 | Ullendorf | May 26, 1931 |
| 2,199,588 | Cobham et al. | May 7, 1940 |

FOREIGN PATENTS

| Number | Country | Date |
|---|---|---|
| 795,517 | France | Jan. 8, 1936 |